A. W. REYNOLDS.
TRACTOR PLOW.
APPLICATION FILED FEB. 7, 1920.

1,363,755.

Patented Dec. 28, 1920.
3 SHEETS—SHEET 1.

Inventor
Arthur W. Reynolds.
By Chamberlain + Newman
Attorneys

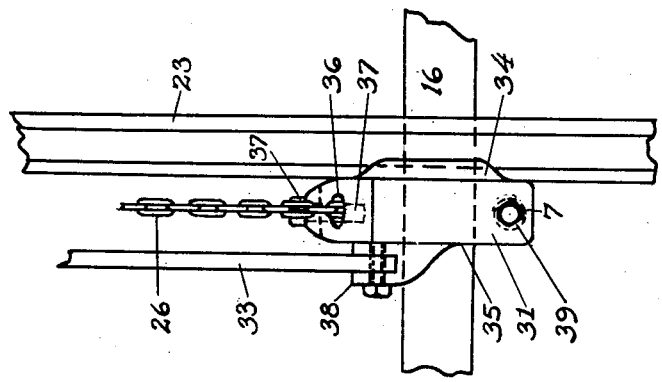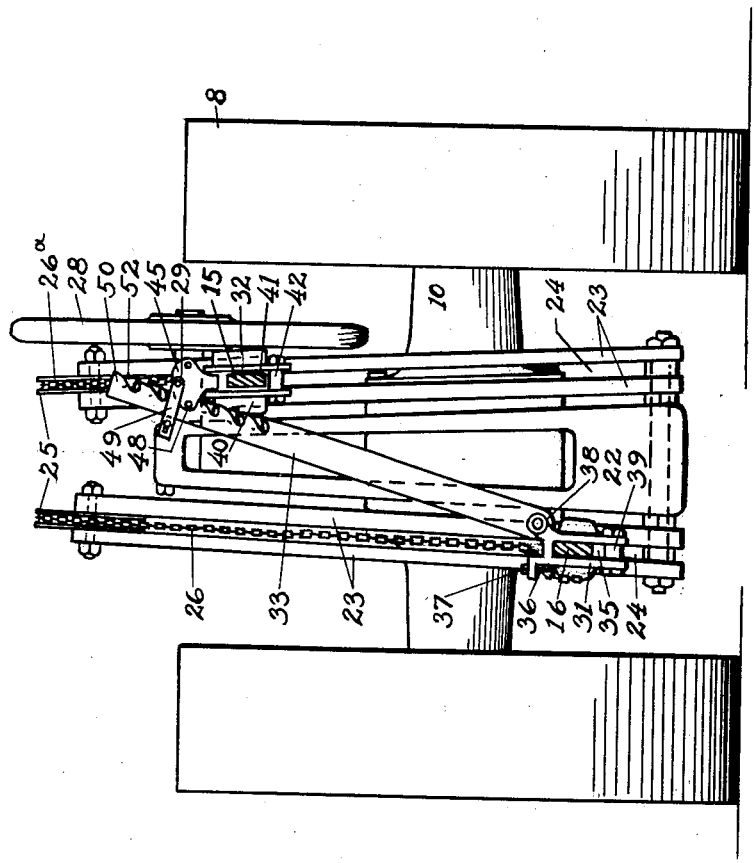

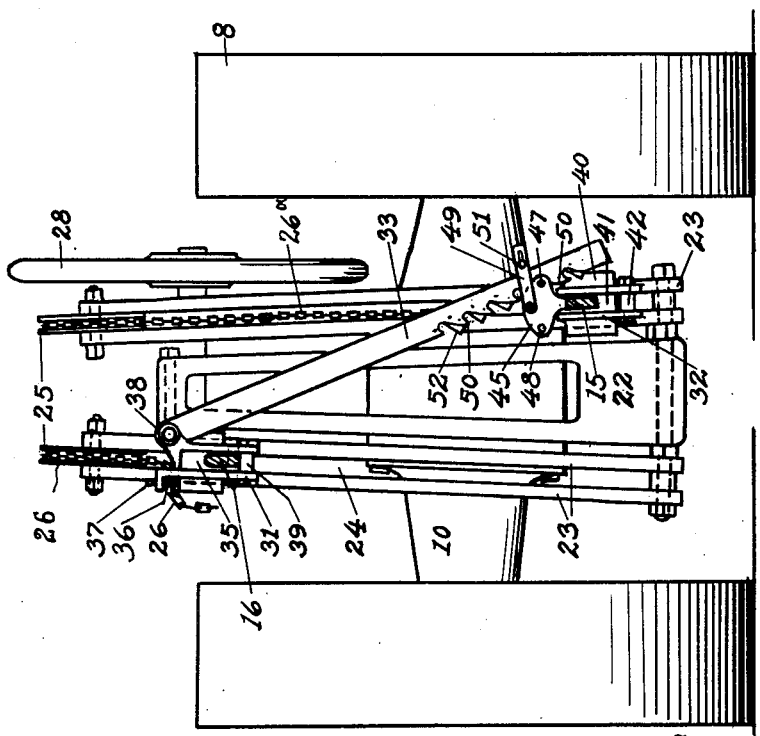

UNITED STATES PATENT OFFICE.

ARTHUR W. REYNOLDS, OF NEWTOWN, CONNECTICUT, ASSIGNOR OF ONE-HALF TO EDWARD BENEDICT, OF NEWTOWN, CONNECTICUT.

TRACTOR-PLOW.

1,363,755.   Specification of Letters Patent.   Patented Dec. 28, 1920.

Application filed February 7, 1920. Serial No. 356,819.

*To all whom it may concern:*

Be it known that I, ARTHUR W. REYNOLDS, a citizen of the United States, and resident of Newtown, in the county of Fairfield and State of Connecticut, have invented certain new and useful Improvements in Tractor-Plows, of which the following is a specification.

This invention relates to improvements in tractor plows and refers more particularly to what are known as two-way plows, which include two plows, one being designed to throw a furrow to the right and the other to the left.

The invention as included in this application is shown applied to the particular style of plow, illustrated and claimed in my prior tractor plow Patent, #1,301,744, but is also adapted to be applied and used in connection with other makes of plows.

The object of my invention is to provide means whereby the weight of the raised plow when idle, may be carried upon the plow that is working, so as to better hold the lowered plow in the ground.

Further to provide means whereby this supporting connection can be automatically shifted with the lowering of either plow and the raising of the other, and so that the weight of either plow when raised will be carried on the lowered plow, and finally to provide operating means convenient to the operator's seat for simultaneously shifting the plows and the intervening supporting mechanism without any additional trouble or labor over what is customarily employed for raising and lowering the plows alone.

The invention further resides and consists in the construction, combination and arrangement of parts hereinafter more fully described, illustrated in the accompanying drawings and pointed out in the following claims.

Similar characters of reference will be found to denote like or corresponding parts throughout the several figures of the accompanying drawings forming a part of this specification and upon which, Figure 1 shows a side view of my patented type of plow having my present improvements applied thereto.

Fig. 2 shows a rear sectional elevation of the plow shown in Fig. 1, the plows being omitted to better illustrate the automatic supporting connection.

Fig. 3 shows an enlarged side view of the slidable yoke to which the adjustable brace is pivotally connected.

Fig. 4 is a further rear sectional elevation somewhat like Fig. 2 but showing a reversed position of the plow beams and supporting connections.

Fig. 5 is an enlarged sectional elevation of the mechanism shown in the lower portion of Fig. 4 whereby the supporting brace is adjustably connected with the plow beam, and Fig. 6 shows a side view as seen from the right of Fig. 5.

Figure 1:
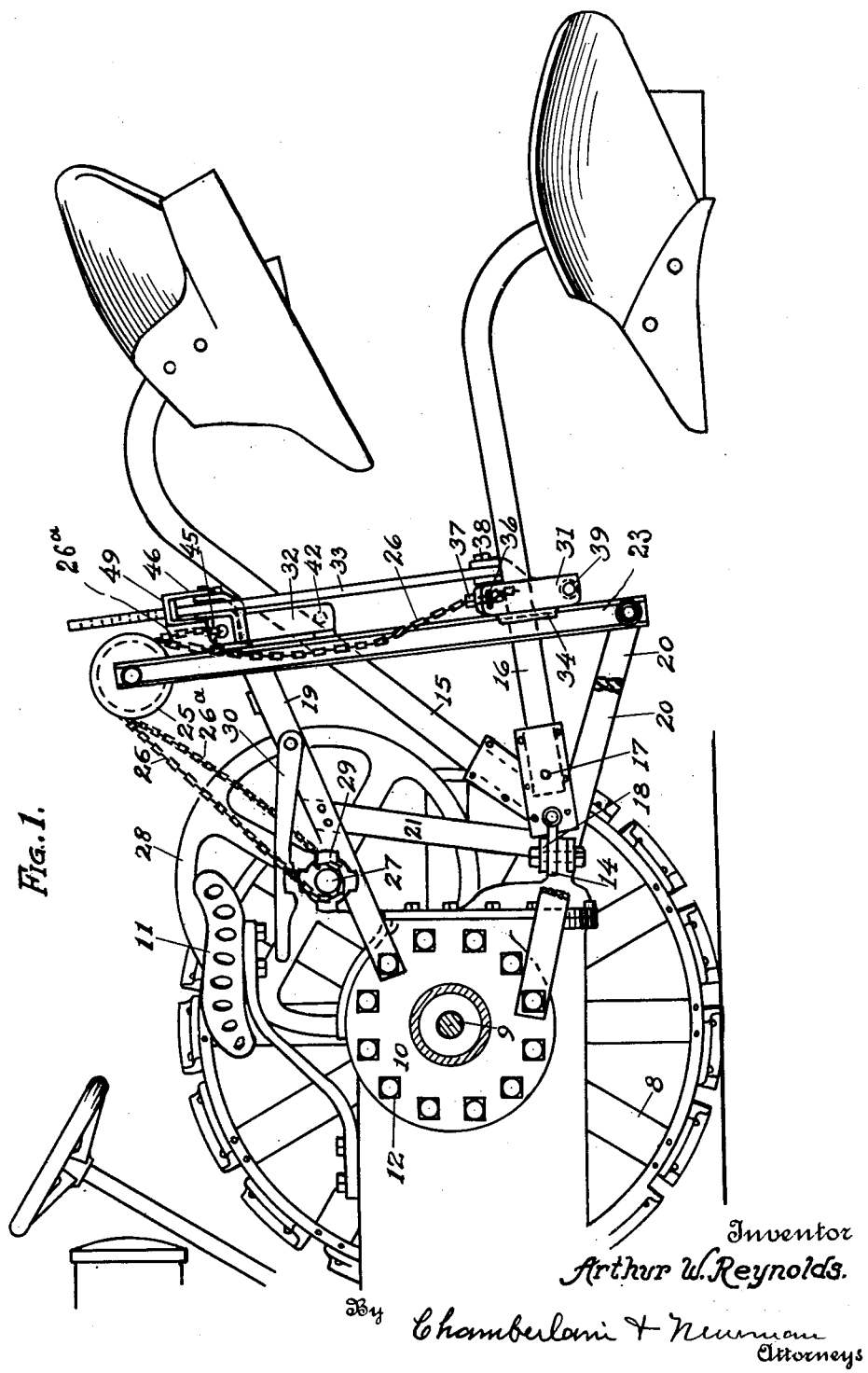

The particular type of plow herein shown, is like that shown in my said patent and is designed for attachment to a commercial type of tractor, and includes an attachable frame to which the forward ends of the plow beams are pivotally connected and by means of which the said plow beams are guided, and further includes mechanism for raising and lowering the plows as is necessary when turning around.

Referring in detail to the characters of reference marked upon the drawings, 8 represents the tractor wheels, 9, the axle, 10 the transmission case and 11 the seat which is supported upon the main body portion of the tractor, 12 indicates a series of screws positioned in the transmission case. 14 shows a lug extending rearwardly from the transmission case, and to which the plow beams 15 and 16 are detachably connected through the medium of a breakable pin 17 and a drawbar 18.

The plow frame is detachably connected with the transmission case through the medium of the screws 12 before mentioned and as will be seen includes two upper members 19—19 and two lower members 20—20, the same being properly spaced apart and their forward ends positioned for attachment to the sides of the transmission case by means of the said screws 12. Braces 21 connect the upper member on one side of the frame with the lower member on the same side, while the rear ends of the said upper and lower frame members are secured to the rear upright 22 shown in Figs. 2 and 4.

Upon the two sides of this rear portion 22 of the frame are provided two pairs of vertical guide members 23 properly spaced apart to form guideways 24 in which the plow beams are free to be raised or lowered. A guide wheel 25 is rotatably mounted between the upper ends of each pair of these guides 23 and serves to support and guide the two chains 26 and 26ᵃ. One end of one chain is connected to support one plow beam and an end of the other chain is connected to support the other beam. The forward ends of both chains are attached to the winding shaft 27, mounted in bearings secured to the upper member of the frame.

This shaft is provided with an operating wheel 28 and a notched disk 29 that is engaged by a holding dog 30 pivotally connected to one of the upper members of the frame. The forward end of one of these chains 26 is attached to wind on the under side, so that by turning the shaft in one direction, one of the plows would be raised and the other one lowered, whereas by turning the shaft in the other direction the position of the plows would be reversed. So much of the mechanism thus far described is more or less in accord with construction of my patent referred to and is included herein to afford a practical application of my present improvements.

The vertically disposed guides 23 are preferably formed of channel iron each having two outwardly disposed flanges that serve for the attachment of the yokes 31 and 32 which are slidably connected, one of said yokes being attached to a flange of each guide on one side of the plow frame and the other yoke to a flange of each guide on the other side. These yokes are slightly different in construction, one serving as a pivotal connection for one end of the adjustable supporting brace 33 and the other serving for an adjustable sliding connection for the other end portion of the brace. I will therefore first describe the form of yoke 31 shown at the bottom in Fig. 2, to which the lower end of the said brace as shown in that figure is pivotally connected. This yoke in addition to having runways 34 to engage the flanges of the vertical guides, is provided with an elongated opening 35 through which the plow beams 16 extend and which affords a limited amount of independent vertical movement of the yoke and beam with respect to each other.

One of the chains 26 heretofore mentioned is adjustably connected to this yoke 31 by being passed through a hole 36 in the upper portion of the yoke and engaged by a pin 37 set in a flange of the yoke. An eye 38 is formed upon the opposite upper corner of the yoke for the pivotal connection of the brace 33. The lower end of the yoke is provided with a roll 39 upon which the plow beam rests when in a raised position as shown in Fig. 4.

The yoke designated as 32 and shown in enlarged Figs. 5 and 6 also includes guide ways 40 to engage the flanges of the guides, and is provided with an opening 41 through which the plow beam operates, and further includes a roll 42 upon which the plow beam rests when in a raised position. This yoke is also provided with an adjustable chain connection similar to that employed for the other yoke, consisting of a hole through which the chain is passed and a pin 43 seated in a hole of the flange 44 on the upper end of the yoke. To the upper portion of this guide are secured two vertically disposed flanges 45 and 46 which are properly spaced apart to receive the toothed end of the brace. A pin 47 extends through one edge portion of one of these plates and a pin 48 through the opposite edge. A yoke 49 is pivotally connected to the outside of these guide plates and extends up and over the brace to hold it in operative position between the plates so that its teeth 50 will engage either of the pins 47 or 48 when the brace is brought to a position of rest. The roll 51 serves to engage the back edge of the brace to afford a free movement of the brace when shifting positions. The teeth 50 in the under edge portion of the brace serve to engage the pins 47 and 48 and each tooth is provided with a pawl 52 that is pivotally supported therein by a pin 53 so as to be free to swing to open or close the pockets between the teeth of the braces as the position of the brace is shifted. The movements of these pawls are limited and their position determined by means of the stop pins 54.

In order to shift the position of the plows as shown in Figs. 1 and 2 it would first be necessary to turn the hand wheel rearward to raise the plow beam 15 and its yoke 32, sufficiently to disengage the pin 48 from the pocket of the tooth in the brace, thereby permitting the pawl positioned in the tooth to drop down to close the tooth pocket in the same manner that the rest of the pockets are closed by the other pawls, and thereby insure a free movement of the toothed edge of the brace over the said pin 48 as the plow beam 15 and its yoke are lowered by the reverse movement of the hand wheel.

This reverse movement of the hand wheel will obviously wind up the chain 26 on the near side of the machine as seen in Fig. 1 and loosen the chain 26ᵃ upon the far side in a way to raise the near beam 16 and lower the far beam 15. This reverse positioning of the two beams and their connected yokes would obviously cause the free end of the brace to be shoved up and across the pin 48 and out between the two guides 44 and 45. As the lower beam is raised past the upper beam the brace is gradually drawn back through the loop 49, and the teeth 50 brought into engagement with the pin 47 at the opposite side, so the yoke will retain the brace in an upright position for the purpose of supporting the other plow beam 16 upon the lower beam 15, and thereby adding weight to the lowered plow, better to hold it in the ground.

As the position of the brace becomes reversed as shown in Fig. 4 the pawls 52 swing down in a way to leave the pockets in the teeth open for engagement by the pin 47, whereas when the brace is disposed upward as shown in Fig. 2, the pawls hang down in a way to close the pockets in the teeth. When it is desired to change the position of the plow beams 15 and 16 from that shown in Fig. 4 to that shown in Fig. 2 it would first be necessary to turn the hand wheel forward slightly to raise the yoke 31 and brace and to disengage the pin 47 from the pocket in the brace 33, and then to reverse the movement of the hand wheel which will obviously raise the beam 15 and lower the beam 16 and the yoke 31 which in turn move the brace and pawls outward to engage and slide over the pin 47. In this respect it should be borne in mind that as the pin 47 contacts with the pawls the latter are swung over on their pivots 53 in a manner to close the pockets and to prevent the pin from entering, thereby insuring a free movement of the brace until it comes to a position of rest and is seated in one of the pockets as shown in Fig. 2.

Having thus described my invention, what I claim and desire to obtain by Letters Patent, is—

1. In a plow of the class described, the combination with a plow frame including means to vertically guide two plow beams, a pair of plows having their beams pivotally connected to move vertically with respect to the frame, a supporting brace pivotally connected to one of said plow beams, and means for adjustably connecting the other end of the brace to the other plow beam.

2. In a plow of the class described, the combination with a plow frame including means to vertically guide two plow beams, a pair of plows having their beams pivotally connected to move vertically with respect to the frame, a yoke slidably connected to one of said plow beams, a supporting brace pivotally connected to said yoke, and means for adjustably connecting the other end of the brace to the other plow beam.

3. In a plow of the class described, the combination with a plow frame including means to vertically guide two plow beams, a pair of plows having their beams pivotally connected to move vertically with respect to the frame, a yoke slidably mounted upon each of the plow beams, a supporting brace pivotally connected to one of said yokes, and means for adjustably connecting the other end of the brace to the other yoke.

4. In a plow of the class described, the combination with a plow frame including means to vertically guide two plow beams, a pair of plows having their beams pivotally connected to move vertically with respect to the frame, a supporting brace pivotally connected to one of said plow beams, means for adjustably connecting the other end of the brace to the other plow beam, and means for raising and lowering the plow beams and shifting the position of the brace to support the raised plow beam upon the lowered plow beam.

5. In a plow of the class described, the combination with a plow frame including means to vertically guide two plow beams, a pair of plows having their beams pivotally connected to move vertically with respect to the frame, means for alternately raising and lowering said beams, a yoke slidably connected to one of said plow beams, a supporting brace pivotally connected to said yoke, and means for automatically and adjustably connecting the other end of the brace to the other plow beam to support one beam upon the other.

6. In a plow of the class described, the combination with a plow frame including vertical ways to guide the plow beams, a pair of plows having their beams pivotally connected to the frame and slidably mounted in the guideways, a yoke slidable on said ways and connected to support one of the plow beams, a supporting brace pivotally connected to said yoke, and means for adjustably connecting the other end of the brace to the other plow beam.

7. In a plow of the class described, the combination with a plow frame including two vertical ways to guide the plow beams, a pair of plows having their beams pivotally connected to the frame and slidably mounted in the guideways, a yoke slidable on each pair of ways, a supporting brace pivotally connected to one of said yokes and adjustably connected to the other to support one upon the other, and means for simultaneously operating the yoke plows and brace to reverse the position of the plows.

8. In a plow of the class described, the combination with a plow frame including vertical ways to guide the plow beams, a pair of plows having their beams pivotally connected to the frame and slidably mounted on the guideways, yokes mounted upon both the guides and beams, a supporting brace pivotally connected to one of the said yokes, and means for adjustably connecting the other end of the brace to the other plow yoke and means connected to the yokes for raising and lowering the same and plow beams.

ARTHUR W. REYNOLDS.

Witnesses:
C. M. NEWMAN,
LILLIAN M. ALLING.